(12) United States Patent
Lertrattanapanich et al.

(10) Patent No.: US 8,363,978 B2
(45) Date of Patent: Jan. 29, 2013

(54) SYSTEM AND METHOD FOR BLOCK EDGE LOCATION WITH VARYING BLOCK SIZES AND OFFSETS IN COMPRESSED DIGITAL VIDEO

(75) Inventors: Surapong Lertrattanapanich, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1002 days.

(21) Appl. No.: 12/396,877

(22) Filed: Mar. 3, 2009

(65) Prior Publication Data

US 2010/0226573 A1 Sep. 9, 2010

(51) Int. Cl.
*G06K 9/40* (2006.01)
(52) U.S. Cl. ......................... 382/275; 382/168; 382/170
(58) Field of Classification Search .................... None
See application file for complete search history.

(56) References Cited

U.S. PATENT DOCUMENTS

| | | | |
|---|---|---|---|
| 5,850,294 A * | 12/1998 | Apostolopoulos et al. | 358/426.14 |
| 5,974,192 A | 10/1999 | Kundu | |
| 6,389,177 B1 * | 5/2002 | Chu et al. | 382/268 |
| 6,738,528 B1 * | 5/2004 | Nio et al. | 382/268 |
| 6,798,918 B2 * | 9/2004 | Chu et al. | 382/268 |
| 7,003,174 B2 * | 2/2006 | Kryukov et al. | 382/266 |
| 7,218,794 B2 * | 5/2007 | Lin et al. | 382/268 |
| 7,430,319 B2 * | 9/2008 | Hyoki et al. | 382/168 |
| 7,756,340 B2 * | 7/2010 | Alexander | 382/192 |
| 7,805,018 B2 * | 9/2010 | Lesellier et al. | 382/275 |
| 7,944,588 B2 | 5/2011 | Yamada et al. | |
| 7,986,855 B2 * | 7/2011 | Namiki et al. | 382/275 |
| 8,077,774 B1 * | 12/2011 | Dawson | 375/240.02 |
| 2003/0053708 A1 * | 3/2003 | Kryukov et al. | 382/261 |
| 2003/0113000 A1 * | 6/2003 | Hyoki et al. | 382/112 |
| 2006/0227883 A1 | 10/2006 | Citro | |
| 2006/0251174 A1 * | 11/2006 | Caviedes et al. | 375/240.24 |
| 2007/0058726 A1 | 3/2007 | Ha et al. | |
| 2007/0071095 A1 | 3/2007 | Lim | |
| 2007/0140590 A1 * | 6/2007 | Kimura | 382/275 |
| 2008/0013833 A1 * | 1/2008 | Alexander | 382/182 |
| 2008/0166060 A1 | 7/2008 | Lee et al. | |
| 2008/0199102 A1 * | 8/2008 | Namiki et al. | 382/268 |
| 2009/0245755 A1 * | 10/2009 | Lee et al. | 386/114 |
| 2010/0002953 A1 | 1/2010 | Kirenko et al. | |
| 2010/0014596 A1 | 1/2010 | Bruton et al. | |
| 2010/0033633 A1 | 2/2010 | Dane et al. | |
| 2010/0060749 A1 * | 3/2010 | Srinivasan et al. | 348/222.1 |
| 2011/0243466 A1 * | 10/2011 | Lee | 382/233 |

* cited by examiner

*Primary Examiner* — Chan S Park
*Assistant Examiner* — Sean Motsinger

(57) ABSTRACT

Embodiments include systems and methods of determining block edge location in video. In one embodiment, a system includes a block edge map generator configured to generate a binary block map, the block map having indicators representing the locations of block edges in a first direction, a histogram generator configured to accumulate the indicators to form a block edge histogram, the peaks of the histogram corresponding to block edge locations in the image, a low-pass filter to low-pass filter the block edge histogram and form a filtered histogram, a peak locator configured to identify the peaks of the filtered histogram, and a peak refiner configured to refine locations of peaks located in the filtered block edge histogram based on the identified peaks and peaks in the block edge histogram, the refined peak locations indicative of block edge locations, and further configured to provide block locations.

21 Claims, 10 Drawing Sheets

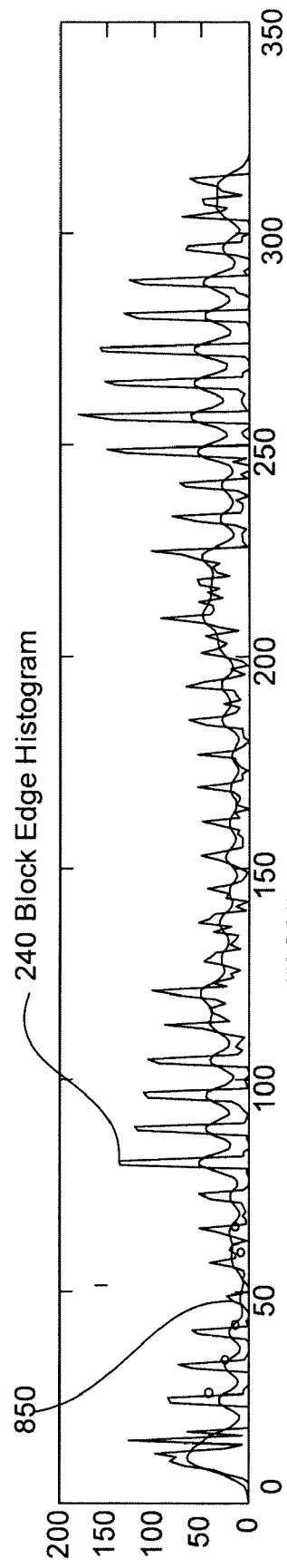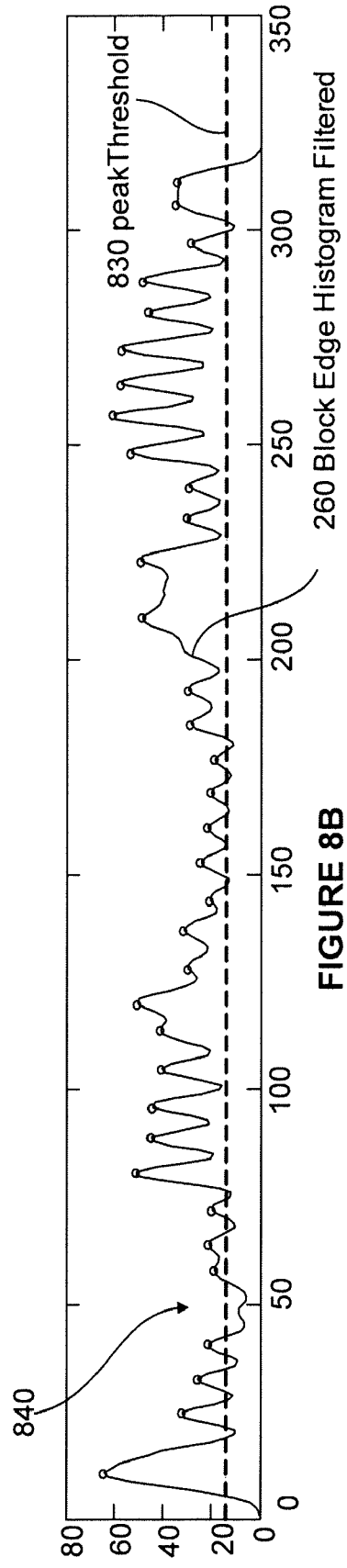
FIGURE 8A
FIGURE 8B

SYSTEM AND METHOD FOR BLOCK EDGE LOCATION WITH VARYING BLOCK SIZES AND OFFSETS IN COMPRESSED DIGITAL VIDEO

BACKGROUND OF THE INVENTION

1. Field of the Invention

This application relates to processing digital video, and more particularly to reducing artifacts in video due to data compression.

2. Description of the Related Technology

Processing and handling uncompressed digital video can require enormous resources. Uncompressed video requires vast amounts of space to store. Broadcasting uncompressed digital video requires a large bandwidth, and the digital video requires large amounts of electronic storage space at the recipient. Therefore, in almost all aspects of video processing, transmission, and storage, some type of video compression is used. Some data compression techniques are lossless, such that when the video is decompressed, the result is a bit-for-bit perfect match with the original. While lossless compression of video is possible, it is rarely used. Instead, lossy compression techniques are used because they result in far higher compression ratios while maintaining an acceptable level of quality, which is the point of video compression.

Video information may be organized within a frame or other video object (e.g., a video object plane (VOP)) in blocks. In some video encoding/decoding schemes, a block may include, for example a 2×2, 4×4, or 8×8 group of pixels, for example, "Y" luma pixels. Chroma (i.e., U/V, or Cr/Cb) pixels may be depicted in a similar block organization. Some encoding/decoding schemes further group blocks of pixel video information into macroblocks. If a digital image is overcompressed in a lossy manner, visible artifacts can appear. For example, when using quantization with block-based coding (for example, in JPEG-compressed images) several types of artifacts can appear, including "mosquito noise" around edges, and/or blockiness in "busy" regions (sometimes called quilting or checkerboarding). Video compression schemes (for example, MPEG-2, MPEG-4, H.264) may also yield artifacts such as blocking and noise especially around strong object edges in the subsequently uncompressed digital video. Certain video encoding/decoding schemes may employ deblocking filters to smooth edges between adjacent blocks. Such deblocking filters may improve the appearance of decoded video data and may improve compression performance for encoded video data. However, these deblocking filters assume prior knowledge of block size and/or offset and may also only operate on certain block sizes and offsets. Accordingly, a need exists for improved deblocking processing.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed. After considering this discussion, and particularly after reading the section entitled "Detailed Description of Certain Embodiments" one will understand how the features of this invention provide advantages that include allowing a video processor to locate block edge of any scaling ratio of various types of input video. The advantages also include providing deblocking video processing requiring lower memory bandwidth when compared to other processing techniques because only the horizontal and vertical block locations (each a 1-D array of indices) need be stored.

In one embodiment, a method of locating block edges in an image comprises receiving an image having a number of data blocks, generating a first block map using the image, the block map having binary indicators indicating the locations of block edges in the image in a first direction, and forming a first direction block edge histogram by accumulating the binary indicators in the first block map in a direction normal to the first direction, the first direction block edge histogram having peaks corresponding to locations of block edges in the first direction. The method can also include low-pass filtering the first direction block edge histogram to form a filtered first direction block edge histogram, identifying locations of peaks in the filtered first direction block edge histogram, refining the identified peak locations based on the location of peaks in the first direction block edge histogram, and providing block edge location information for the image in the first direction, the block edge locations being based on the refined peak locations. In some embodiments, refining peak locations comprises positioning the location of peaks identified in the filtered block edge histogram at the location of the peaks in the block edge histogram. The method can be performed such that the first direction is vertical or horizontal, e.g., relative to the image. The method can be performed in a first direction to provide block edge locations for the image in the first direction, and then performed in a second direction to provide block edge locations for the image in the second direction. The block edge locations for the first and second direction can be provided to a deblocking filter for deblocking the image.

In some embodiments of a method of locating block edges in an image, generating a block map includes, for a plurality of pixels in the image, extracting a set of pixels along a first direction, the set of pixels comprising a considered pixel and at least one neighbor pixel on either side of the considered pixel, calculating an average value of the pixel values for the pixels in the set of pixels, assigning to each pixel in the set of pixels a first sign if the pixel value is less than the mean of the pixels in the set of pixels, otherwise assigning the pixel a second sign, assigning an indicator to the considered pixel, the indicator indicative of whether or not a block edge is present at the considered pixel location. In some embodiments, the first sign is zero (0) and the second sign is one (1). The image may comprise a frame of video data. The video data can comprise luminance components for the plurality of pixels. In some embodiments the average value is the mean of the pixel values in the set of pixels. In some embodiments, the block map edge indicator is indicative that a block edge is present if there is only one sign change in the signs of adjacent pixels in the set of pixels, the sign change occurs at the considered pixel, and the maximum of the average absolute value of second derivative of neighbor pixel values on one side of the considered pixel and the average absolute value of second derivative of pixel values on the other side of the considered pixel is greater than a nonzero positive threshold value, for example, less than about 10, or less than about 5.

The method of generating a block map can also comprise forming a binary block map comprising the block edge indicators. Generating a block map can further comprise refining the indicator assignment at pixels in the plurality of pixels having an indicator that a block edge exists, the refining being based on the block edge indicators of pixels vertically and horizontally adjacent to the pixels assigned an indicator that a block edge exists. In some embodiments, for example where the first direction is horizontal, and wherein the method further comprises refining the indicator assignment at each pixel in the plurality of pixels having a indicator indicting that a block edge exists, the refining comprising, for a current pixel, maintaining the indicator if it is determined that the adjacent pixel above and below the current pixel also has a block-edge indicator and if it is determined that the adjacent pixel left or right of the current pixel does not have block-edge indicator, and otherwise assigning a indicator to the current pixel indicating that a block edge does not exists at the current pixel.

Another embodiment includes a system of locating block edges in an image, the system comprising a block edge map generator configured to generate a two dimensional binary block map sized to correspond with the image, the block map having indicators representing the locations of block edges in a first direction, a histogram generator configured to accumulate the indicators to form a block edge histogram, the peaks of the block edge histogram corresponding to block edge locations in the image in a first direction, a filter configured to low-pass filter the block edge histogram and form a filtered block edge histogram, a peak locator configured to identify the peaks of the filtered block edge histogram, and a peak refiner configured to refine locations of peaks located in the filtered block edge histogram based on the identified peaks and peaks in the block edge histogram, the refined peak locations indicative of block edge locations, and further configured to provide block locations of the image in the first direction.

Another embodiment includes a method comprising receiving video data formed by a plurality of blocks, the video data having pixels along a first and second direction. For each of a plurality of pixels in the video data, a set of pixels is extracted along the first direction, the set of pixels comprising a considered pixel and at least one neighbor pixel on either side of the considered pixel, forming a set of signs corresponding to the pixels in each set of pixels, the set of signs being formed by assigning a first sign to a pixel if the pixel value is less than the mean of the pixels in the set of pixels, otherwise assigning the pixel a second sign, assigning to each considered pixel a block edge indicator representing a block edge exists at each considered pixel if only one sign change occurs in the set of signs, and if the sign change is at the considered pixel based on the set of signs and the values of the pixels in the set of pixels, refining the indicator assignment at pixels in the plurality of pixels having an indicator that a block edge exists, the refining being based on the block edge indicators of pixels vertically and horizontally adjacent to the pixels assigned an indicator that a block edge exists. The method can further comprise forming a binary block map comprising the block edge indicators, accumulating the block edge indicators in the binary block map into a block edge histogram where the peaks of the block edge histogram indicate the location of block edges in the input image in the first direction, filtering the block-edge histogram to form a filtered block edge histogram, identifying locations of peaks in the filtered block edge histogram, refining peak locations in the filtered block edge histogram based on the peaks in the block edge histogram, generating block edge locations in the first direction based on the refined peak locations, and providing the indicated block edge locations for use in subsequent deblocking processing. Assigning to each considered pixel a block edge indicator representing a block edge exists can be done subject to the condition that the average of the absolute value of second derivative of pixel values for pixels having the first sign and the average of absolute value of second derivative of pixel values for pixels having a second sign is greater than a predetermined threshold value. In some embodiments, refining the indicator assignment comprises maintaining the block edge indicator for a block edge indicated current pixel if the pixels above and below the block edge indicated current pixel are also block edge indicated pixels, and the pixels on the left side of the block edge indicted current pixel or the pixels on the right side of the block edge indicted current pixel is a block edge indicated pixel. In some embodiments, filtering the block-edge histogram comprises forming a filtered histogram by applying a low pass filter to the block edge histogram. In some embodiments, identification of peaks in the filtered histogram are identified where, for a set of seven adjacent values [A0 A1 A2 A3 A4 A5 A6 A7] of the filtered histogram, value A3 corresponds to a peak if A3 is the maximum value of values [A0 A1 A2 A3 A4 A5 A6 A7], A1<A2 or A4>A5, A0≦A1 or A5≧A6, and A3>a predetermined peak threshold.

Another embodiment includes a computer-program product for locating block edges in an image, the product comprising a computer-readable medium having stored thereon codes executable by at least one processor to receive an image having a number of data blocks, generate a first block map using the image, the block map having binary indicators indicating the locations of block edges in the image in a first direction, form a first direction block edge histogram by accumulating the binary indicators in the first block map in a direction normal to the first direction, the first direction block edge histogram having peaks corresponding to locations of block edges in the first direction, low-pass filter the first direction block edge histogram to form a filtered first direction block edge histogram, identify locations of peaks in the filtered first direction block edge histogram, refine the identified peak locations based on the location of peaks in the first direction block edge histogram, and provide block edge location information for the image in the first direction, the block edge location information being based on the refined peak locations.

Another embodiment includes a system for locating block edges in an image, comprising means for receiving an image having a number of data blocks, means for generating a first block map using the image, the block map having binary indicators indicating the locations of block edges in the image in a first direction, means for forming a first direction block edge histogram by accumulating the binary indicators in the first block map in a direction normal to the first direction, the first direction block edge histogram having peaks corresponding to locations of block edges in the first direction, means for low-pass filtering the first direction block edge histogram to form a filtered first direction block edge histogram, means for identifying locations of peaks in the filtered first direction block edge histogram, means for refining the identified peak locations based on the location of peaks in the first direction block edge histogram, and means for providing block edge location information for the image in the first direction, the block edge location information being based on the refined peak locations.

BRIEF DESCRIPTION OF THE DRAWINGS

FIG. 8A is a graph illustrating an example of a block edge histogram.

FIG. 8B is a graph illustrating an example of a block edge histogram, after being low-pass filtered.

DETAILED DESCRIPTION OF CERTAIN EMBODIMENTS

Figure 1:
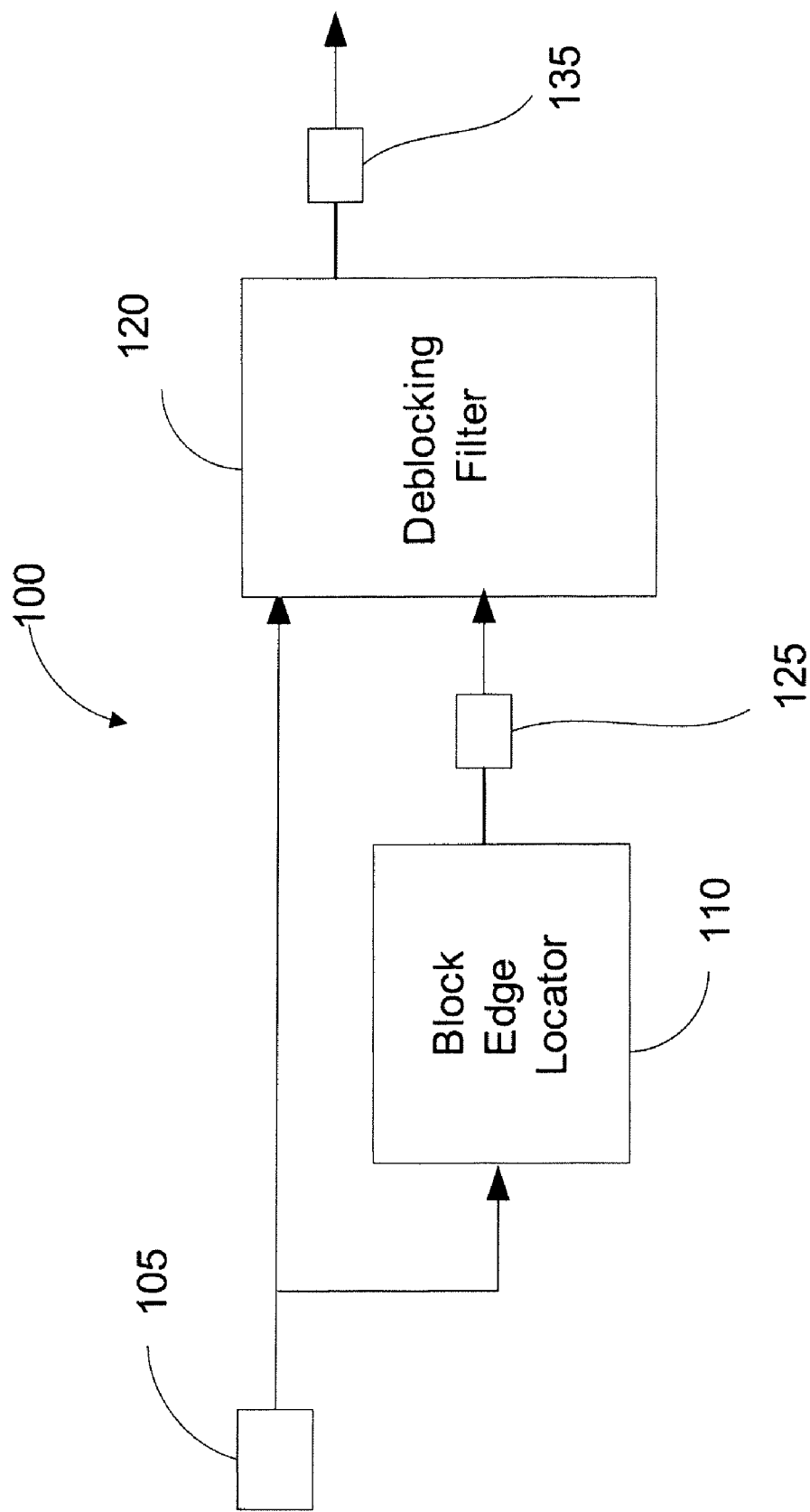
FIG. 1 is a block diagram illustrating components of one embodiment of a deblocking system.

The following detailed description is directed to certain specific system and method embodiments of the invention. However, the invention can also be embodied in a multitude of different ways. In this description, reference is made to the drawings wherein like parts are designated with like numerals throughout. The particular examples described herein, and the words "example" or "exemplary" when used herein, are for purposes of illustrating one or more embodiments and are not meant to limit the scope of the embodiments or the claims.

In various encoding/decoding schemes, digital video can be cropped or resized to suitable resolution before it is viewed on a television or other multimedia system. This can result in shifting the block edge location offset (block offset) and distance between adjacent block edge locations (block size). For example, in some embodiments the resizing scheme could be one of the following: (1) standard definition (720× 480) ("SD") to high definition (1336×768) ("HD"); (2) SD to full high definition (1920×1080) ("FHD"); (3) HD to FHD; (4) overscanned×1.2 H/V (upscaled by scaling ratio of 1.2 in both horizontally and vertically); (5) underscanned×0.8 H/V (downscaled by scaling ratio of 0.8 in both horizontally and vertically); and (6) any scaling ratio. Certain embodiments described herein locate the block edge location (blocking boundary) in a video image so that a subsequently applied deblocking algorithm can reduce blocking artifacts in an image. The described block edge locator can locate the block edges of video with arbitrary scaling ratio and cropping. Such embodiments require no prior knowledge of block size and offset; instead, they will be estimated without such knowledge. In addition, such embodiments can accept various types of video inputs regardless of their block size and offsets such as nonscaled, scaled, overscanned, underscanned, and cropped.

For some non-scaled video, block edges in an image may be located 8 pixels apart in the horizontal (width) and vertical (height) direction, and the offset of block edge locations with respect to the upper left corner of video may be zero (0) in both the horizontal and vertical direction. Accordingly, this can be referred to as block size 8×8 and block offset (0, 0). By resizing the video, the block size, and the block edge locations, also changes accordingly. For example, for the SD to FHD case, where a standard definition 8×8 block size can be re-sized to full high definition block, the resized block size becomes 21.3333×18 (i.e., 1920/720*8=21.3333; 1080/480*8=18). For a standard definition case where a SD 8×8 block size is overscanned, the new block size becomes 9.6× 9.6 (i.e., 8*1.2=9.6). If the video is cropped, the block offset may not start at (0, 0). Deblocking method and system embodiments described herein can receive various types of video inputs regardless of their block sizes and offsets such as nonscaled, scaled, overscanned, underscanned, and cropped. Such embodiments are capable of locating block edge of any scaling ratio of various types of input videos. Additionally, such embodiments can require lower memory bandwidth because they obviate the need to store the whole block edge map (mask) for deblocking; instead only the H/V block locations (1-D array of indices) are used.

FIG. 1 is a block diagram illustrating components of a deblocking system 100, according to one embodiment. The deblocking system 100 includes a block edge locator 110 in data communication with a deblocking filter 120. In operation, an input image 105 can be provided to the deblocking system 100 to remove or minimize artifacts (e.g., blocking). The input image 105 can be a decoded mage. For example, an image that was previously subject to data encoding and decoding (by, for example, MPEG-2, MPEG-4, or H.264 or other data manipulation schemes including, for example, resizing, scaling, overscanning or underscanning). However, the block edge locations and/or block size of the input image 105 may not be known. The deblocking system 100 can be implemented on a variety of computer, communication, or display systems, including but not limited to televisions or multimedia components of an entertainment system. The received input image 105 is passed into the block edge locator 110. The block edge locator 110 can perform block edge location horizontally and provide horizontal block edge locations, and perform block edge location vertically and provide vertical block edge locations. In other words, the block edge locator 110 identifies the block edge locations 125 of the input image 105 in (one or) both of the horizontal direction (e.g., along a x-direction of the input image 105) and vertical direction (e.g., along a y-direction of the input image 105). Accordingly, the block edge locations 125 illustrated in FIG. 1 represents, and can include, two sets of data, the vertical block edge locations and the horizontal block edge locations.

The block edge locator 110 provides the block edge locations 125 to a deblocking filter 120. The deblocking filter 120 is configured to receive the block edge locations 125 and the input image 105. The deblocking filter 120 performs deblocking of the input image 105 based on the block edge locations 125, and provide a deblocked output image 135. The deblocking filter 120 can manipulate the pixel data of the input image 105 in the regions of the identified horizontal and vertical block edges of the input image 105 using one or more of a variety of smoothing schemes.

The block edge locator 110 can identify block edge locations in both the vertical and horizontal direction. The methods and systems described herein to identify the vertical and horizontal direction block edge locations of the input image 105 are similar. Accordingly, description herein pertaining to determining block edge locations in the horizontal direction directly pertains to determining block edge locations in the vertical direction, and vice-versa, unless otherwise stated. To obviate redundancy of the disclosure, determining block edge locations will be described in particular reference to determining the locations of block edges in the horizontal directional; however, the same technique can be equally applied to determining block edge locations in the vertical direction, unless otherwise stated.

Figure 2:
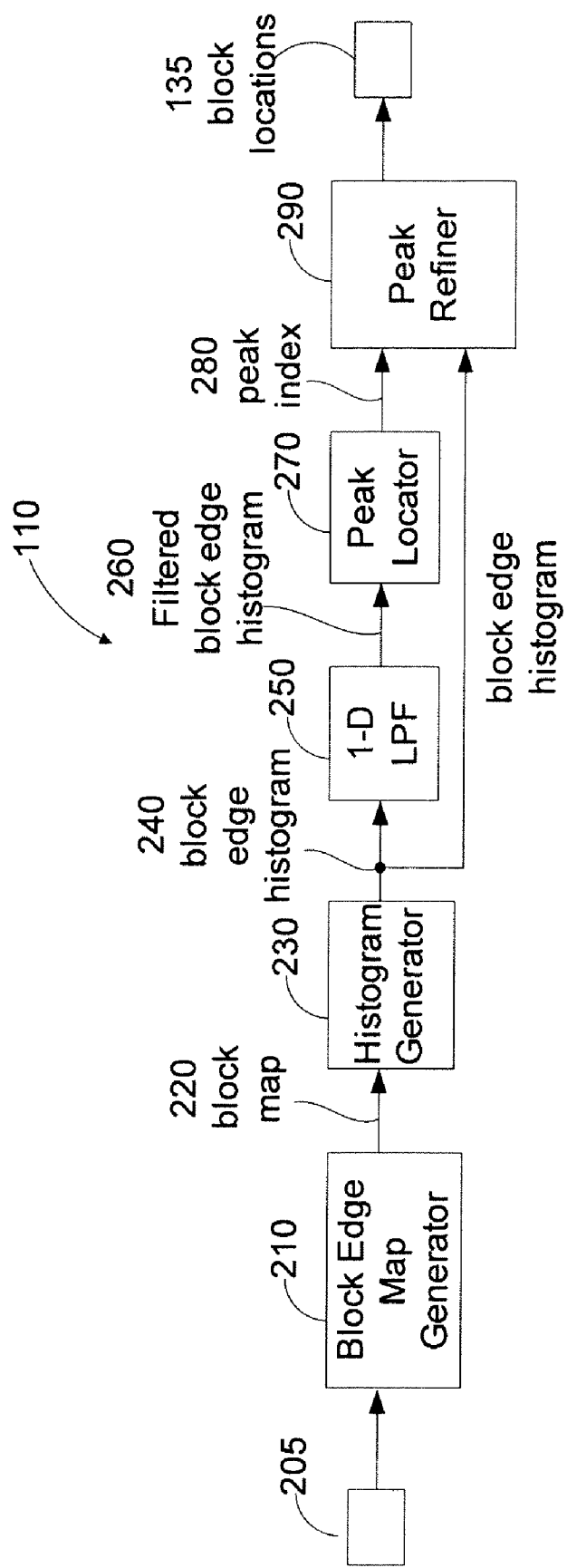
FIG. 2 is a block diagram illustrating components of one embodiment of a block edge locator that can be used in connection with the system of FIG. 1.

FIG. 2 is a block diagram illustrating components of one exemplary embodiment of a block edge locator 110 that can be used in connection with the system of FIG. 1. The block edge locator 110 can include numerous components (or modules) which can be implemented in hardware or software (including firmware), or a combination of both, according to different embodiments. A block edge map generator 210 of the block edge locator 110 is configured to receive a component of the current input image, in this example the input image luminance component 205. The block edge map generator 210 can produce a binary representation of the input image, block edge map 220, which is provided to a histogram generator 230. The histogram generator 230 is configured to process the block edge map 220 and generate and output a block edge histogram 240. When the block edge locator 110 is run in the horizontal direction, the resulting horizontal block edge histogram depicts a series of peaks that indicate locations of block edges in the horizontal or x-direction of the block map 220. When the block edge locator 110 is run in the vertical direction, the resulting vertical block edge histogram illustrates a series of peaks that indicate locations of block edges in the vertical or y-direction of the block map 220.

As illustrated in FIG. 2, the block edge locator 110 also includes a one dimensional (1-D) filter 250, for example a low pass filter ("LPF"). This filtering can be implemented in hardware or software. The 1-D LPF 250 can smooth the block edge histogram 240 to produce a filtered block edge histogram 260. A peak locator 270 receives the filtered block edge histogram 260 and determines its peak locations, storing this information in peak index 280. In this embodiment, the filtered block edge histogram 260 is used by the peak locator 270 instead of unfiltered block edge histogram 240 to avoid false detection caused by spurious peaks that may be present in the unfiltered block edge histogram 240.

The peak index 280 is provided to a peak refiner 290. The peak refiner 290 is configured to receive the block edge histogram 240. Because the peak index 280 is obtained using the filtered block edge histogram 260, the identified peak locations (e.g., move the peak locations) in filtered block edge histogram 260 may not coincide with the actual peaks of the block edge histogram 240. Accordingly, the peak refiner 290 can refine the peak locations to make sure the identified peaks in peak index 280 coincide with the locations of the peaks in the block edge histogram 240.

Figure 3:
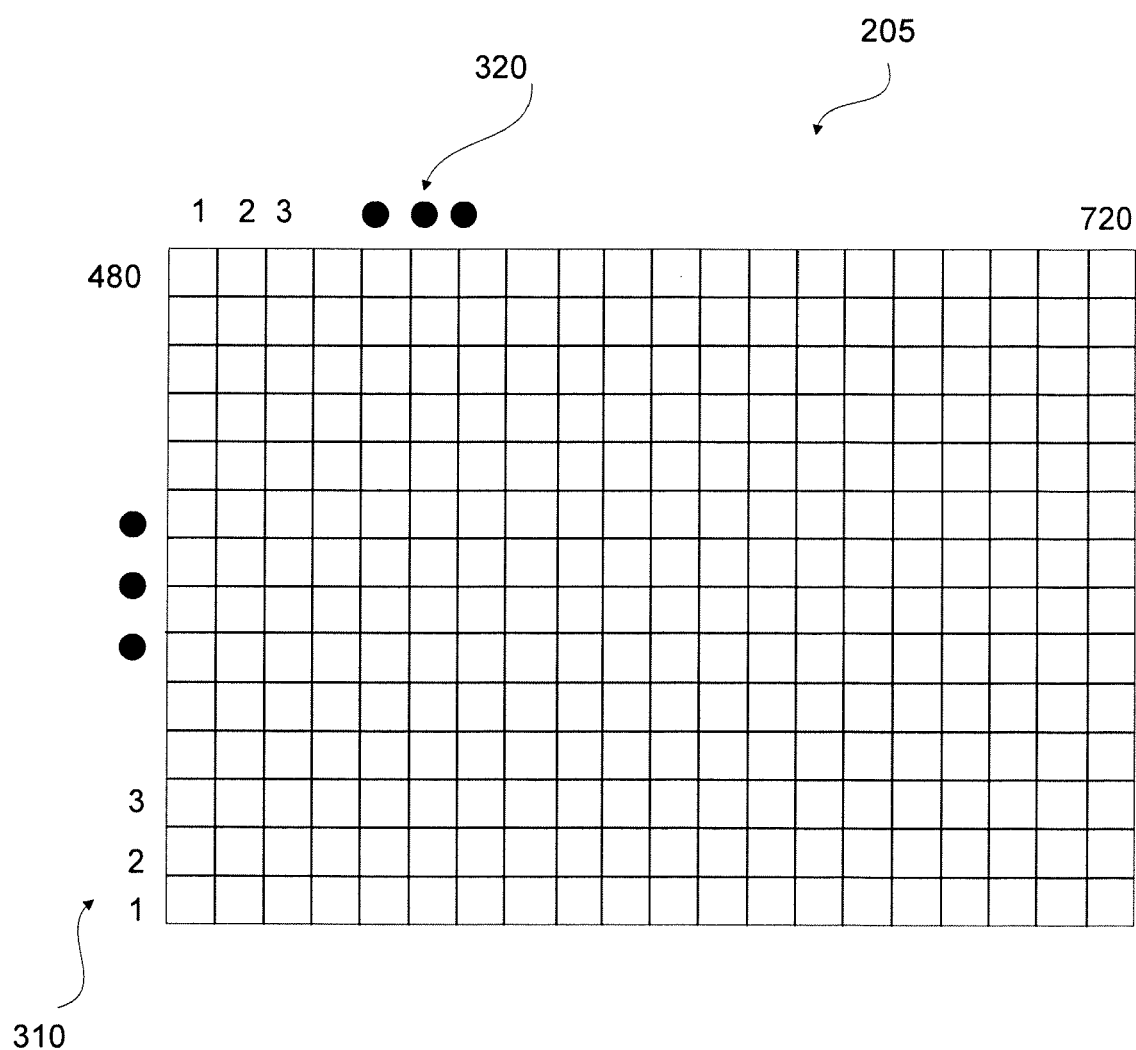
FIG. 3 is a schematic illustrating an example of luminance data input to a block edge map generator illustrated in FIG. 2.

FIG. 3 is a schematic illustrating an example of a luminance component input image 205 received by the block edge map generator 210 illustrated in FIG. 2. The block edge map generator 210 receives the luminance component of input image 205. In this example, the luminance component input image 205 is a standard definition frame with a vertical size of 480 rows (pixels) 310 illustrated along the left hand edge of the block map 300, and a horizontal size of 720 columns (pixels) 320 (e.g., 720×480) illustrated along the top edge of the block map 300. Other sized images (for example, high definition 1336×768 pixels, and full high definition 1920× 1080) can also be processed for block edge locations by the block edge map generator 210.

Figure 4:
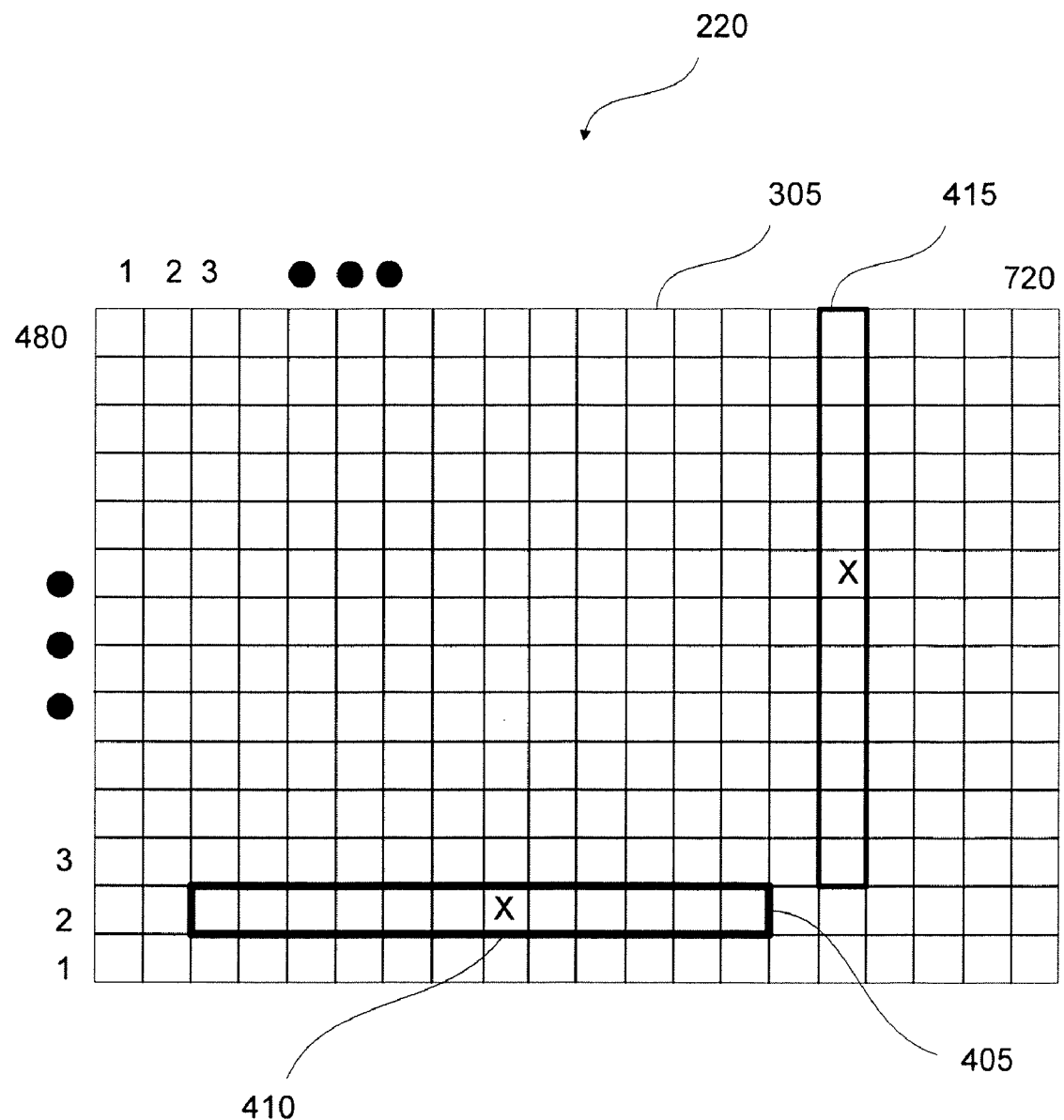
FIG. 4 is a schematic illustrating an example of a set of pixels extracted in a horizontal direction (and a vertical direction) from image input data, the set of pixels including a considered pixel and certain neighbor pixels.

FIG. 4 illustrates some of the processing that can be performed by the block edge map generator 230, according to one embodiment. For horizontal block edge location processing, for a plurality of pixels in a block map 220 (for example, for each pixel in the block map 220) the block edge map generator 230 extracts a set of pixels 405 from the input image 205. FIG. 4 shows an exemplary set of pixels 405 extracted in a horizontal direction from the input image 205. The set of pixels includes a considered pixel 410 and its neighbors, in this case six pixels to the left of the considered pixel 410 and five pixels to the right. When locating vertical block edge locations, an extraction of a set of pixels 415 can be extracted in a similar manner, but vertically. The extracted set of pixels 405 illustrated in FIG. 4 includes twelve pixels. However, in other embodiments, the extracted set of pixels 405 can have a considered pixel and more or fewer total neighboring pixels, or more or fewer neighboring pixels included on either side of the considered pixel.

Figure 5:
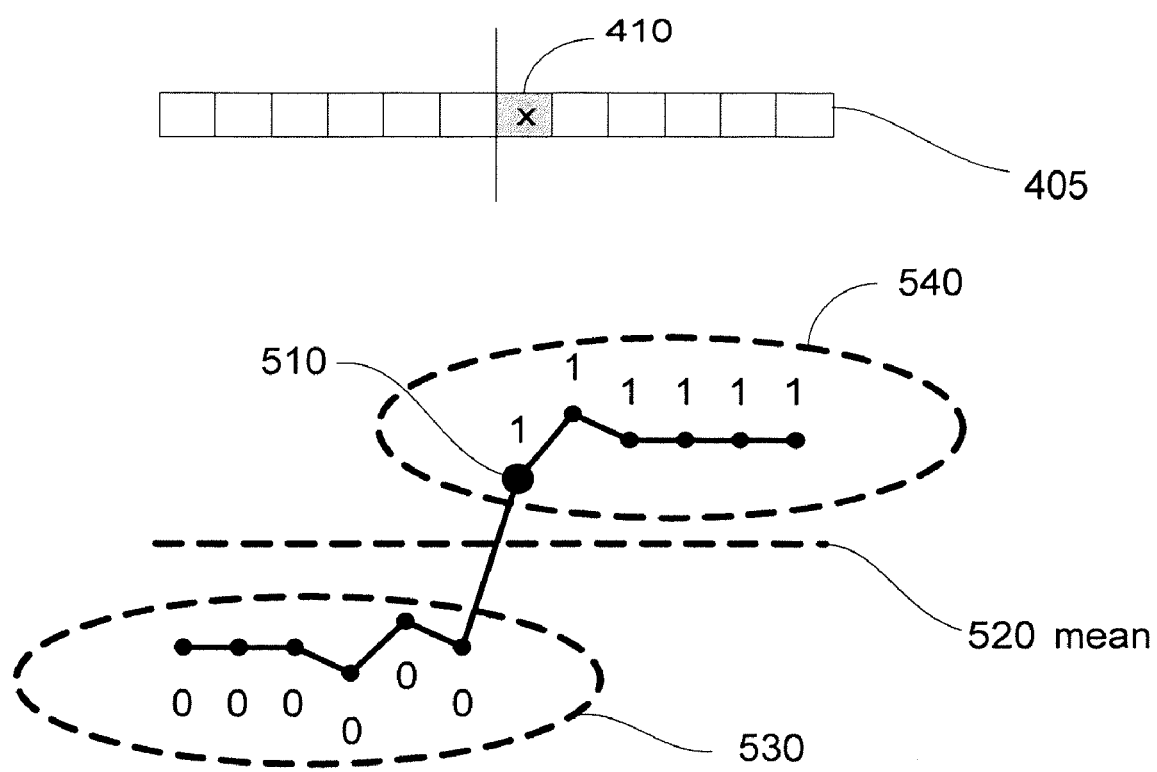
FIG. 5 is a schematic illustrating an example of pixel bisection that is performed on the extracted set of pixels for locating the block edges.

FIG. 5 is a schematic illustrating an example of pixel bisection that the block edge map generator 230 performs on the extracted set of pixels 405 while locating block edges. The block edge map generator 230 determines an average value of the pixels in the extracted set of pixels, in this example, the mean 520 of the pixel values in the extracted set of pixels 405. In other embodiments, the median value or another calculated average value may be used. Then, a bisection indicator is assigned to each pixel in the extracted set of pixels 405 based on whether or not the pixel value for that particular pixel is above or below the mean 520. The sign of each pixel is defined by comparing its value with the mean value 520. Specifically, if the pixel value is lower than the mean, the sign assigned to the pixel is 0; otherwise, 1. A sign change occurs whenever there is a change from 0 to 1, or 1 to 0, for the signs assigned to the extracted set of pixels 405. In this example, a "0" is assigned to pixels having a pixel value below the mean 520, and a "1" is assigned to pixels having a pixel value above the mean 520.

FIG. 5 illustrates the relationship between the extracted set of pixels 405, here depicted above the corresponding pixels assigned bisection indicators of "0" (group 503) and pixels assigned bisection indicators of "1" (group 540). The binary decision is made whether the set of pixels is block edge or not depending on if the extracted set of pixels 405 are deemed to be "bisected." The set of pixels is considered to be bisected by a block edge if and only if, after assigning bisection indicators, all three of the following conditions are met: Condition 1: for the signs assigned to the extracted set of pixels 405 if there is only one sign change (from "0" to "1" or from "1" to "0") of the bisection indicators; Condition 2: the sign change location must happen at the considered pixel 410; and Condition 3: the maximum of the second derivative of pixel values left of the considered pixel and the second derivative of pixel values right of the considered pixel 410 must be greater than a predetermined threshold value "T," for example, max (Avg $2^{nd}$ Der$_L$, Avg $2^{nd}$ Der$_R$)>Threshold. The second derivative can be calculated various ways, for example, by applying an absolute value to horizontal spatial filer ¼*[−1 2 −1] to the considered pixel 410 and its neighbors. When determining the vertical block edges, a similar vertical spatial filter can be applied.

In the example illustrated in FIG. 5, Condition 1 is met because there is only one change of sign from "0" to "1" as illustrated by the two groups of bisection indicators 530, 540. Condition 2 is also met, because the sign change location occurs at the considered pixel 410 assigned the bisection indicator of "1" 510, which is adjacent to a bisection indicator of a "0" to the left in group 530 and a "1" to the right in group 540. Condition 3 ensures the pixel values to the left and right of the considered pixel 410 do not exhibit large variations from pixel to pixel despite being above the mean 520. Here, Condition 3 is also considered met. Condition 3 prevents the false detection when pixel values within 405 are of ramp-like. That is, they are monotonically increasing or decreasing, e.g., [10 20 30 40 50 60 70 80 90 100 110 120]. The ramp-like pixel value set usually satisfies both Conditions 1 and 2 but should not be classified as block edge pixel. Accordingly, the threshold is selected to be a small value but have to be greater than zero since the average of $2^{nd}$ derivative of those ramp-like pixel values is equal to or very close to zero. One of skill in the art will appreciate that the term "small value" depends on the input bit resolution of the image. With a higher input bit resolution, the threshold value can be larger. An image with lower input bit resolution may use a lower threshold value. In some embodiments, the threshold value is less than about 10. In other embodiments, the threshold value is about 5. For example, in one embodiment particular the threshold value for 8-bit luminance input image is about 3.

As a result of determining if the extracted set of pixels bisects a block edge, each considered pixel meeting the three above-stated conditions is deemed to indicate a block edge and is assigned an appropriate identifier, for example, IS_BLK_EDGE; otherwise the considered pixel is assigned a different identifier, e.g., NOT_BLK_EDGE. This processing can continue until each pixel in the input image 205 is considered and assigned an appropriate identifier based on the three above-stated conditions.

Figure 6:
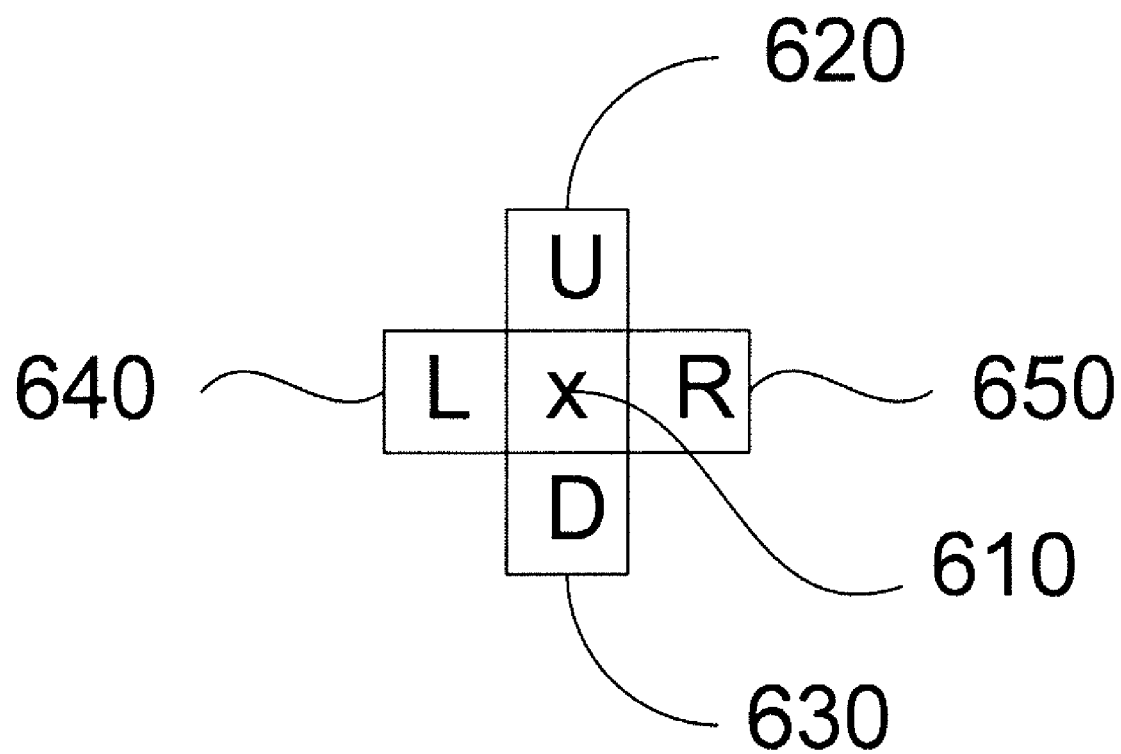
FIG. 6 is a schematic illustrating an example of binary filtering of a current pixel with its neighboring pixels.
Figure 7:
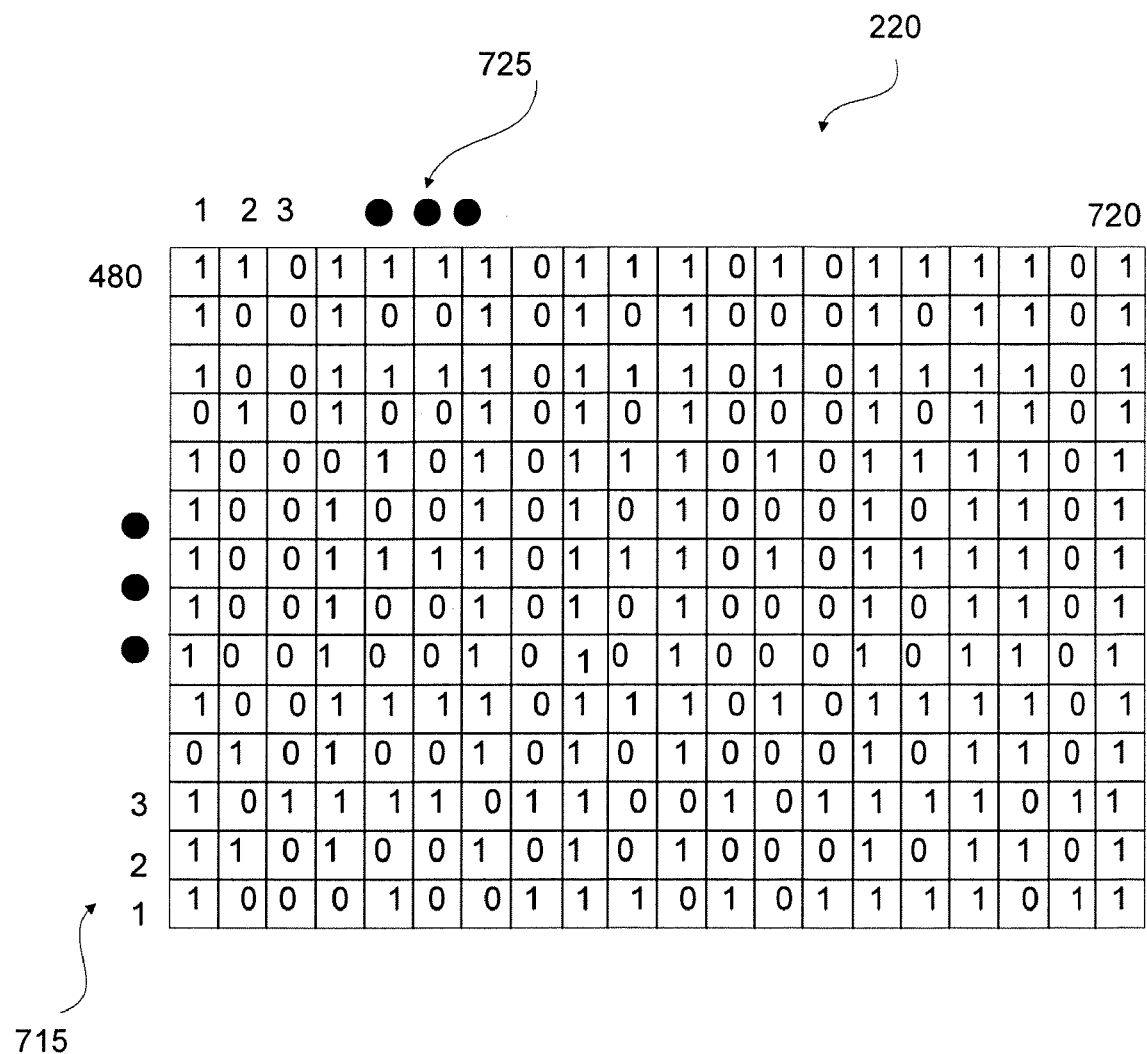
FIG. 7 is a schematic illustrating an example of a block map made by the block edge map generator illustrated in FIG. 2.

Next, the block edge map generator 230 refines the assignment of the IS_BLK_EDGE indicators. FIG. 6 illustrates one embodiment of binary filtering a pixel 610 with its four pixel neighbors 620, 630, 640, 650, to refine the decision that a particular pixel indicates the presence of a block edge. Once the decision for each pixel is made (e.g., assigned IS_BLK_EDGE), the binary filtering depicted in FIG. 6 can be applied to refine the decision. The decision at current pixel 610 is made based on its four neighbors: Upper pixel U 620, downward pixel D 630, left pixel L 640, and right pixel R 650. The resulting filtered output at current pixel x 610 maintains the block edge assigned identifier IS_BLK_EDGE if and only if the following two conditions are satisfied: Condition 1: (pixel x is assigned IS_BLK_EDGE indicator and the upper pixel U 620 and the downward pixel D 630 is also assigned IS_BLK_EDGE; and Condition 2: the left pixel L 640 is assigned NOT_BLK_EDGE or the right pixel R 650 is assigned NOT_BLK_EDGE. If these two conditions are not met the pixel x 610 is assigned a NOT_BLK_EDGE identifier indicating that there is not a block edge of that location. The block edge map generator 230 then forms a binary block map 220 (FIG. 7) based on the IS_BLK_EDGE and NOT_BLK_EDGE identifiers. In FIG. 7, the block map 220 is sized in x and y the same as the luminance input map 205 (FIG. 3) having 480 data points along the vertical edge 715 and 720 points along the horizontal edge 725. FIG. 7 illustrates the identifiers IS_BLK_EDGE by a "1" and NOT_BLK_EDGE by a "0."

The block edge map generator 210 provides the completed block map 220 to a histogram generator 230. When the block edge locator 110 performs horizontal block edge location, the histogram generator 230 accumulates the identifiers (e.g., 0: NOT_BLK_EDGE, 1: IS_BLK_EDGE) of block map 220 vertically to form a 1-D histogram, block edge histogram 240, along the horizontal direction of the block map 220. Similarly, when the block edge locator 110 performs vertical block edge location, the histogram generator 230 accumulates the identifiers (e.g., 0: NOT_BLK_EDGE, 1: IS_BLK_EDGE) of block map 220 horizontally to form a 1-D block edge histogram along the vertical direction of the block map 220. FIG. 8A illustrates an example of a portion of a resulting block edge histogram 240 formed along the horizontal direction of the block map 220.

After generating a horizontal (or vertical) block edge histogram, the histogram generator 230 provides the block edge histogram 240 to a filtering component 250 (FIG. 2). The filtering component 250 applies a low-pass filter to the block edge histogram 240 to form a filtered block edge histogram 260. Low pass filtering can remove many of the spurious peaks apparent in the block edge histogram 240, the spurious peaks being those small spikes near a big peak which show up in the (non-filtered) block edge histogram 240 but not in the filtered block edge histogram 260. FIG. 8B illustrates an example of a filtered block edge histogram 260.

The filtered block edge histogram 260 is then provided to a peak locator 270 (FIG. 2). The peak definition used by the peak locator 270, according to one embodiment, can be defined as follows: Let [A0 A1 A2 A3 A4 A5 A6] be seven adjacent histogram values of filtered block edge histogram 260 centered around A3's location "k" i.e., filtered block edge histogram [k−3, . . . , k+3]. To say that the location k is a peak, all of the following four conditions must be satisfied: Condition 1: A3=max (A0, A1, . . . , A6); Condition 2: A1<A2 or A4 22 A5; Condition 3: A0<=A1 or A5>=A6; and Condition 4: A3>Peak Threshold 830. As a result, the peak locator 270 generates a peak index 280 (FIG. 2) that contains information indicating all of the k locations having a peak. The peak index 280 is provided to a peak refiner 290 (FIG. 2). As illustrated in FIG. 2, the peak refiner 290 also receives the block edge histogram 240.

The peak refiner 290 refines the location of the peaks based on the peak index 280 and the block edge histogram 240. Because the peak locations in the peak index 280 were generated from the filtered block edge histogram 260, rather than the block edge histogram 240, some peak locations may be slightly shifted from the peak locations of the block edge histogram 240. The peak refiner 290 uses the peak values from the peak index 280 and then moves them to align with the corresponding "k" locations of the peaks in the block edge histogram 240. In FIG. 8B, the marks 'o' on the filtered block edge histogram graph 260 illustrate the peak locations that were identified using the peak locator 270 followed by using the peak refiner 290. The peak refiner 290 can also try to fill missing peak locations. For example, as illustrated in FIGS. 8A and 8B, there is a missing peak 840 in the filtered block edge histogram graph 260 around peak index k=50 that corresponds to a peak 850 of the block edge histogram 240. In this case, the peak 850 in the filtered block edge histogram graph 260 is the true peak but its peak level is not strong enough to pass Condition 4, that is, the peak value falls below the peak threshold 830 even though there is an obvious small peak 850 in the block edge histogram graph 240.

Based on the identified peak locations, a peak distance (which later will be referred as "block size") can be determined. For example, suppose that the peak refiner 290 identified peak indices given by [0 8 16 24 32-48 56 64 . . . ]. The average peak distance equals "8." In this example, there is missing peak between locations "32" and "48." In such a case, peak refiner 290 can be configured to try to fill the missing peak by checking if the location at peak distance "40" (e.g., 32+8) is also a peak (as determined by a less strict peak definition than the original peak definition). For example, in one embodiment a less strict peak definition may include only Conditions 1 and 2 of the original peak definition.

The final peak locations, which indicate the block edges of the input image 205 (FIG. 3), marked by symbol 'o' in FIG. 8B, will be saved into a 1-D buffer (or data structure) block locations 135 (FIG. 2) and passed to the deblocking filter 120. It is noted here that the block size can be easily determined based on the locations of edge blocks indicated in the block locations 135. Since the peak locations in block edge histogram 240 indicate the location of block edges, the block size can also be determined based on the distribution of peak distance between adjacent peaks.

Figure 9:
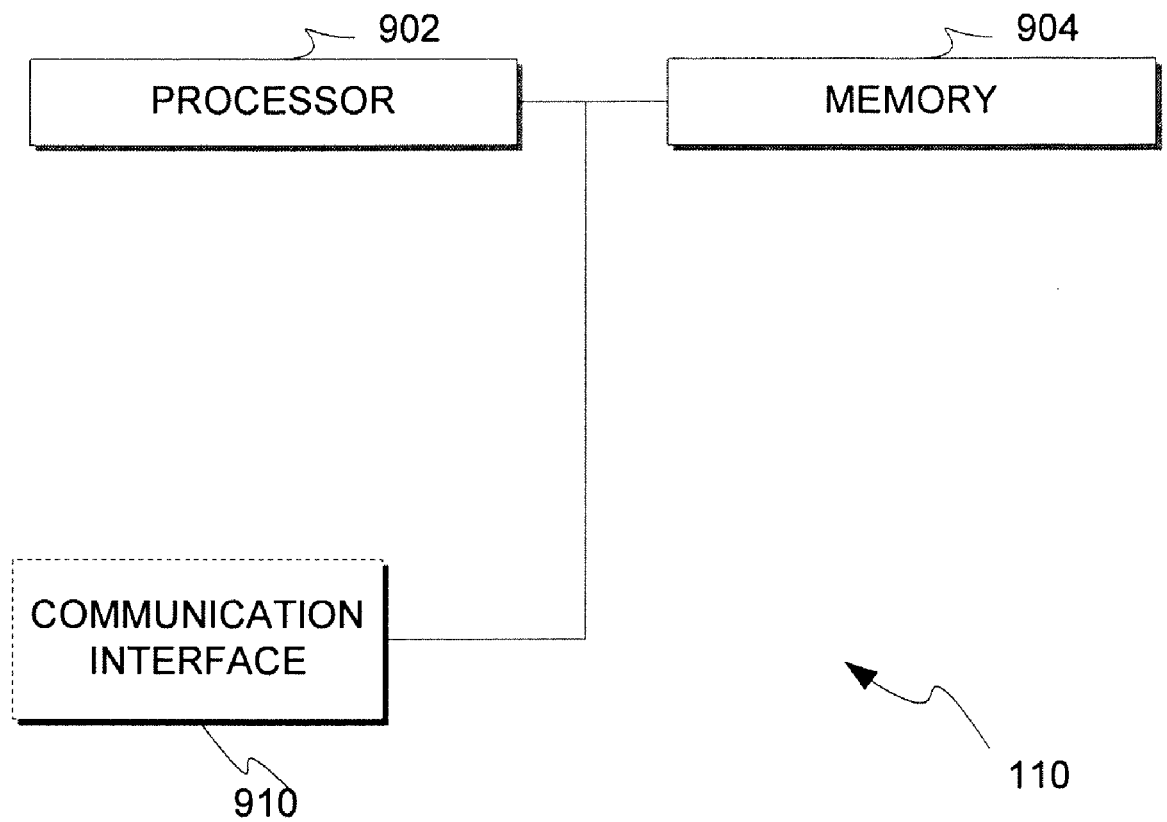
FIG. 9 is a block diagram illustrating components of one embodiment of a block edge locator 110.

FIG. 9 is a block diagram illustrating components of one embodiment of a block edge locator 110. The block edge locator 110 can include a communication interface 910 to receive image information from upstream video processing and to send block location information to downstream video processing components, for example, a deblocking filter 120 (FIG. 1). In some embodiments, the communication interface can comprise a network transceiver. A processor 902 may communicate with the communication interface 910 and with a memory 904. The processor 902 may be configured to perform the various functions associated with locating block edges, including but not limited to receiving video data, block edge map generation, histogram generation, filtering, peak location, peak refinement, and generating and providing block locations. In one embodiment, the memory 904 includes an instruction storage medium having instructions (or data indicative of such instructions where the instructions are stored in compressed or encrypted form) that causes the processor 902 to the perform functions associated with the block edge locator 110.

Figure 10:
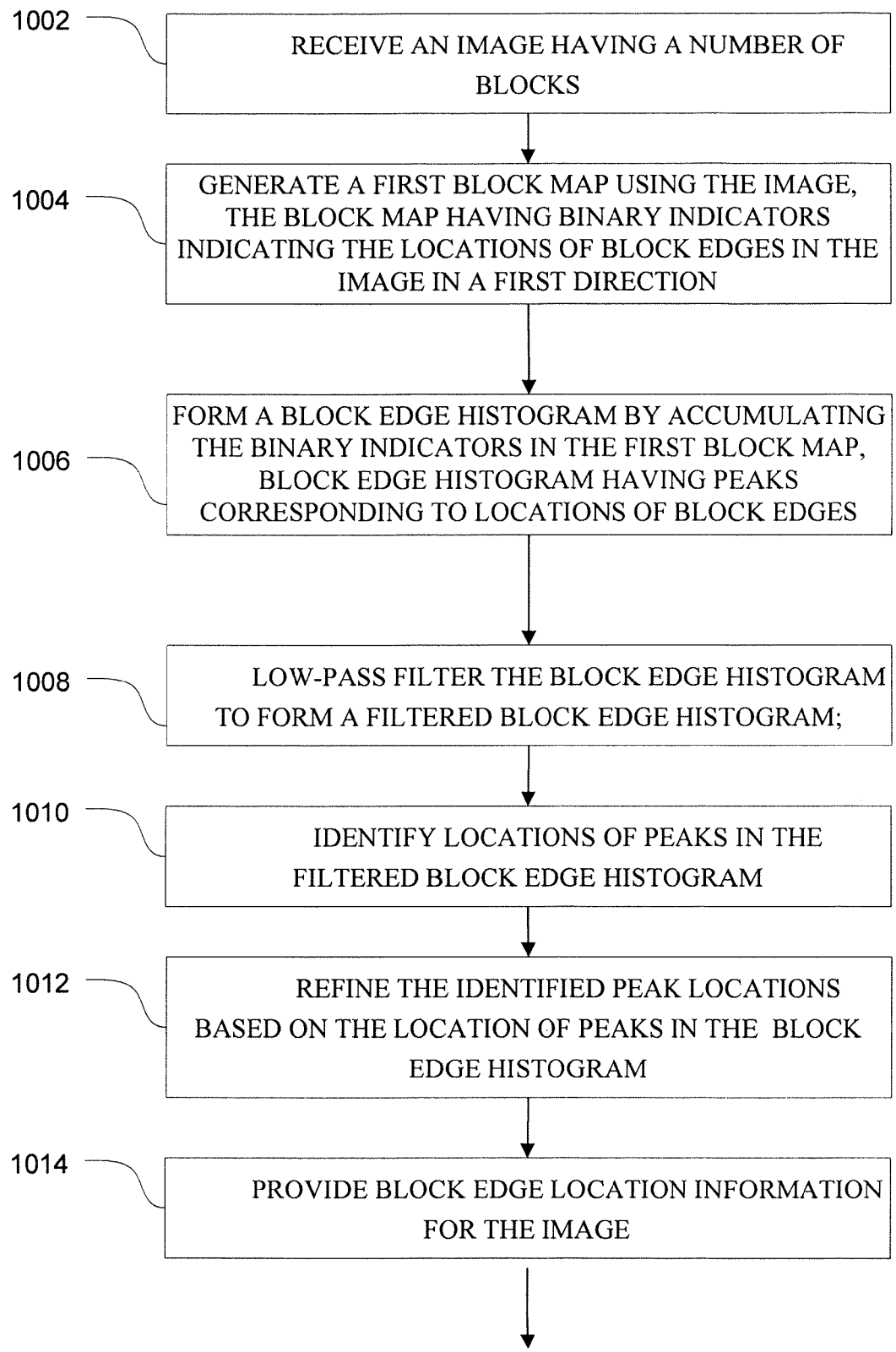
FIG. 10 is a flowchart illustrating a method of locating an edge block, according to one embodiment.

FIG. 10 is a flowchart illustrating a process of locating an edge block, according to one embodiment. In block 1002, the process receives an image having a number of data blocks, for example, a frame of video data formatted as SD, HD, or FHD. In block 1004, the process generates a first block map using the image, the block map having binary indicators indicating the locations of block edges in the image in a first direction. The block edge map generator 210 (FIG. 2) can be configured to perform this step. The block map may be generated with respect to a first direction (e.g., horizontal) or a second direction (e.g., vertical). For determining block locations in both the horizontal and vertical direction, two block maps are formed, and the remaining process steps illustrated in FIG. 10 can be performed on each block map. While the remaining steps of the process in FIG. 10 are described referring to locating blocks in a first direction embodiment, one of skill in the art will appreciate similar steps can be performed for the locating blocks in the second direction.

In block 1006, the process forms a first direction block edge histogram by accumulating the binary indicators in the first block map in a direction normal to the first direction, the first direction block edge histogram having peaks corresponding to locations of block edges in the first direction. The histogram generator 230 (FIG. 2) can be configured to perform this step. Then, in block 1008, the process low-pass filters the first direction block edge histogram to form a filtered first direction block edge histogram. This step can be performed, for example, by the 1-D low pass filter 250 (FIG. 2). Next, in block 1010, the process identifies locations of peaks in the filtered first direction block edge histogram. The peak locator 270 (FIG. 2) can be configured to perform this step. Then, in block 1012 the identified peaks locations are refined based on the location of peaks in the first direction block edge histogram. This step can be performed, for example, by the peak refiner 290 (FIG. 2). Finally, at block 1014, the process provides block locations of the image for further processing (for example, to a deblocking filter), the block locations being based on the refined peak locations.

It is to be recognized that depending on the embodiment, certain acts or events of any of the methods described herein can be performed in a different sequence, may be added, merged, or left out all together (e.g., not all described acts or events may be necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software executed by on or more processors, or combinations of both. To clearly illustrate this interchangeability of hardware and software, various illustrative components, blocks, modules, circuits, and steps have been described above generally in terms of their fuctionality. Whether such functionality is implemented as hardware or software executed by a processor depends upon the particular application and design constraints imposed on the overall system. Skilled artisans may implement the described functionality in varying ways for each particular application, but such implementation decisions should not be interpreted as causing a departure from the scope of the present invention. For example, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a television or other access device. In the alternative, the processor and the storage medium may reside as discrete components in a television or other access device.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of locating block edges in an image, comprising:
   receiving an image having a number of data blocks;
   generating a first block map using the image, the first block map having binary indicators indicating locations of the block edges in the image in a first direction;
   forming a first direction block edge histogram by accumulating the binary indicators in the first block map in a direction normal to the first direction, the first direction block edge histogram having peaks corresponding to the locations of the block edges in the first direction;

low-pass filtering the first direction block edge histogram to form a filtered first direction block edge histogram;

identifying locations of peaks in the filtered first direction block edge histogram;

refining the locations of the peaks identified in the filtered block edge histogram based on positioning the locations of the peaks identified at the locations of peaks in the first direction block edge histogram; and providing block edge location information for the image in the first direction, the block edge location information being based on the locations of the peaks refined.

2. The method of claim 1, wherein the first direction is vertical.

3. The method of claim 1, wherein the first direction is horizontal.

4. The method of claim 1, further comprising:
generating a second block map using the image, the second block map having binary indicators indicating locations of block edges in the image in a second direction;

forming a second direction block edge histogram by accumulating the binary indicators in the second block map in a direction normal to the second direction, the second direction block edge histogram having peaks corresponding to the locations of the block edges in the second direction;

low-pass filtering the second direction block edge histogram to form a filtered second direction block edge histogram;

identifying locations of peaks in the filtered second direction block edge histogram;

refining the locations of the peaks identified based on the location of the peaks in the second direction block edge histogram; and providing block edge location information for the image in the second direction, the block edge location information of the second direction being based on the locations of the peaks refined.

5. The method of claim 1, wherein generating a block map comprises:
for a plurality of a pixel in the image, extracting a set of pixels along the first direction, the set of the pixels comprising a considered pixel and at least one neighbor pixel on either side of the considered pixel;

calculating an average value of pixel values for the pixels in the set;

assigning to each of the pixels in the set a first sign if the pixel value is less than a mean of the pixels in the set of pixels, otherwise assigning the pixel a second sign; and assigning an indicator to the considered pixel, the indicator indicative of whether or not a block edge is present at a considered pixel location, the indicator being indicative of the block edge is present if there is only one sign change in signs of adjacent pixels in the set of the pixels;

a sign change occurs at the considered pixel;

a maximum of an average absolute value of a second derivative of the neighbor pixel values on one side of the considered pixel and the average absolute value of second derivative of pixel values on the other side of the considered pixel is greater than a nonzero small positive threshold value; and forming a binary block map comprising block edge indicators.

6. The method of claim 5, wherein the average value is the mean.

7. The method of claim 5, further comprising refining an indicator assignment at the pixels in the plurality of the pixels having an indicator for indicating the block edge exists, the refining being based on the block edge indicators of the pixels vertically and horizontally adjacent to the pixels assigned with the indicator for indicating the block edge exists.

8. The method of claim 5, wherein the first direction is horizontal, and wherein the method further comprises refining an indicator assignment at each of the pixel in the plurality of the pixels having an indicator for indicting the block edge exists, the refining comprising, for a current pixel, maintaining the indicator if it is determined with the adjacent pixel above and below the current pixel also has a block-edge indicator and if it is determined that the adjacent pixel left or right of the current pixel does not have a block-edge indicator, and otherwise assigning a indicator to the current pixel for indicating the block edge does not exists at the current pixel.

9. The method of claim 5, wherein the first sign is zero (0) and the second sign is one (1).

10. The method of claim 1, wherein the image comprises a frame of video data.

11. The method of claim 10, wherein the frame of video data comprises luminance components for the plurality of the pixels.

12. A system of locating block edges in an image, comprising:
a block edge map generator configured to generate a two dimensional binary block map sized to correspond with the image, the two dimensional binary block map having indicators representing locations of the block edges in a first direction;

a histogram generator configured to accumulate the indicators to form a block edge histogram, peaks of the block edge histogram corresponding to the locations of the block edges in the image in the first direction;

a filter configured to low-pass filter the block edge histogram and form a filtered block edge histogram;

a peak locator configured to identify peaks of the filtered block edge histogram; and a peak refiner configured to refine locations of the peaks located in the filtered block edge histogram based on positioning the peaks identified at the locations of the peaks in the block edge histogram, the locations of the peaks identified indicative of the locations of the block edges, and further configured to provide block edge location information of the image in the first direction.

13. A method, comprising:
receiving an video data formed by a plurality of a blocks, the video data having pixels along a first direction and a second direction;

for each of the pixels in the video data,
extracting a set of the pixels along the first direction, the set of the pixels comprising a considered pixel and at least one neighbor pixel on either side of the considered pixel, forming a set of signs corresponding to the pixels in each set of the pixels, the set of the signs being formed by assigning a first sign to a pixel if a pixel value is less than a mean of the pixels in the set, otherwise assigning the pixel a second sign, assigning to the considered pixel a block edge indicator representing a block edge exists at the considered pixel if only one sign change occurs in the set of signs, and if the sign change is at the considered pixel based on the set of the signs and values of the pixels in the set of the pixels;

refining an indicator assignment at the pixels in a plurality of the pixel having an indicator for indicating the block edge exists, the refining being based on the block edge indicators of the pixels vertically and horizontally adjacent to the pixels assigned with the indicator for indicating the block edge exists;

forming a binary block map comprising the block edge indicators;

accumulating a plurality of the block edge indicators in the binary block map into a block edge histogram where peaks of the block edge histogram indicate the location of the block edges in an input image in the first direction;

filtering the block-edge histogram to form a filtered block edge histogram;

identifying locations of peaks in the filtered block edge histogram;

refining the locations in the filtered block edge histogram based on the peaks in the block edge histogram;

generating block edge locations in the first direction based on the locations of the peaks refined; and providing an indicated block edge locations for use in a subsequent deblocking processing.

14. The method of claim 13, wherein assigning to the considered pixel the block edge indicator representing the block edge exists further requires an average of an absolute value of a second derivative of pixel values for pixels having the first sign and the average of the absolute value of the second derivative of the pixel values for the pixels having a second sign is greater than a predetermined threshold value.

15. The method of claim 14, wherein the threshold value is a nonzero positive value.

16. The method of claim 14, wherein the threshold value is a nonzero positive value less than about 5.

17. The method of claim 13, wherein refining the indicator assignment comprises maintaining the block edge indicator for a block edge indicated current pixel if
the pixels above and below the block edge indicated current pixel are also block edge indicated pixels, and
the pixels on the left side of the block edge indicted current pixel or the pixels on the right side of the block edge indicted current pixel is a block edge indicated pixel.

18. The method of claim 13, wherein filtering the block-edge histogram comprises forming a filtered histogram by applying a low pass filter to the block edge histogram.

19. The method of claim 13, wherein identification of peaks in the filtered histogram are identified where, for a set of seven adjacent values [A0 A1 A2 A3 A4 A5 A6 A7] of the filtered histogram, value A3 corresponds to a peak if
A3 is the maximum value of values [A0 A1 A2 A3 A4 A5 A6 A7];
A1<A2 or A4>A5;
A0<A1 or A5>A6; and
A3>a predetermined peak threshold.

20. A computer-program product for locating block edges in an image, the product comprising:
a non-transitory computer-readable medium having stored thereon codes executable by at least one processor to:
receive an image having a number of data blocks;
generate a first block map using the image, the first block map having binary indicators indicating locations of the block edges in the image in a first direction;
form a first direction block edge histogram by accumulating the binary indicators in the first block map in a direction normal to the first direction, the first direction block edge histogram having peaks corresponding to the locations of the block edges in the first direction;
low-pass filter the first direction block edge histogram to form a filtered first direction block edge histogram;
identify locations of peaks in the filtered first direction block edge histogram;
refine the locations of the peaks identified in the filtered block edge histogram based on positioning the locations of the peaks identified at the locations of peaks in the first direction block edge histogram; and
provide block edge location information for the image in the first direction, the block edge location information being based on the locations of the peaks refined.

21. A system for locating block edges in an image, comprising:
means for receiving an image having a number of data blocks;
means for generating a first block map using the image, the first block map having binary indicators indicating locations of the block edges in the image in a first direction;
means for forming a first direction block edge histogram by accumulating the binary indicators in the first block map in a direction normal to the first direction, the first direction block edge histogram having peaks corresponding to the locations of the block edges in the first direction;
means for low-pass filtering the first direction block edge histogram to form a filtered first direction block edge histogram;
means for identifying locations of peaks in the filtered first direction block edge histogram;
means for refining the locations of the peaks identified in the filtered block edge histogram based on positioning the locations of the peaks identified at the locations of peaks in the first direction block edge histogram; and
means for providing block edge location information for the image in the first direction, the block edge location information being based on the locations of the peaks refined.

* * * * *